(12) United States Patent
Nimmala et al.

(10) Patent No.: US 9,021,156 B2
(45) Date of Patent: Apr. 28, 2015

(54) INTEGRATING INTELLECTUAL PROPERTY (IP) BLOCKS INTO A PROCESSOR

(76) Inventors: Prashanth Nimmala, Beaverton, OR (US); Robert J. Greiner, Beaverton, OR (US); Lily P. Looi, Portland, OR (US); Rupin H. Vakharwala, Hillsboro, OR (US); Marcus W. Song, Hillsboro, OR (US); James A. Beavens, Portland, OR (US); Aimee D. Wood, Hillsboro, OR (US); Jeff V. Tran, Hillsboro, OR (US)

( * ) Notice: Subject to any disclaimer, the term of this patent is extended or adjusted under 35 U.S.C. 154(b) by 742 days.

(21) Appl. No.: 13/222,362

(22) Filed: Aug. 31, 2011

(65) Prior Publication Data

US 2013/0054845 A1    Feb. 28, 2013

(51) Int. Cl.
*G06F 3/00* (2006.01)
*G06F 13/40* (2006.01)

(52) U.S. Cl.
CPC .... *G06F 13/4022* (2013.01); *G06F 2213/0038* (2013.01)

(58) Field of Classification Search
USPC .......................................................... 710/36
See application file for complete search history.

(56) References Cited

U.S. PATENT DOCUMENTS

| | | | |
|---|---|---|---|
| 5,493,566 | A | 2/1996 | Ljungberg et al. |
| 6,009,488 | A | 12/1999 | Kavipurapu |
| 6,233,632 | B1 | 5/2001 | Meiyappan et al. |
| 6,330,647 | B1 | 12/2001 | Jeddeloh et al. |
| 6,427,169 | B1 | 7/2002 | Elzur |
| 6,430,182 | B1 * | 8/2002 | Oyama ......................... 370/388 |
| 6,469,982 | B1 | 10/2002 | Henrion et al. |
| 6,611,893 | B1 | 8/2003 | Lee et al. |
| 6,694,380 | B1 | 2/2004 | Wolrich et al. |
| 6,725,313 | B1 | 4/2004 | Wingard et al. |
| 6,810,460 | B1 | 10/2004 | Kirkwood |
| 6,816,938 | B2 | 11/2004 | Edara et al. |
| 7,065,733 | B2 | 6/2006 | Goodnow et al. |
| 7,124,376 | B2 | 10/2006 | Zaidi et al. |
| 7,308,668 | B2 | 12/2007 | Bueti et al. |
| 7,415,533 | B1 | 8/2008 | Lacroute et al. |

(Continued)

FOREIGN PATENT DOCUMENTS

| | | |
|---|---|---|
| CN | 101620585 A | 1/2010 |
| KR | 10-2005-0077437 | 8/2005 |

(Continued)

OTHER PUBLICATIONS

U.S. Appl. No. 13/248,234, filed Sep. 29, 2011, entitled, "Sending Packets With Expanded Headers", by Sridhar Lakshmanamurthy, et al. (2393).

(Continued)

*Primary Examiner* — Idriss N Alrobaye
*Assistant Examiner* — Dayton Lewis-Taylor
(74) *Attorney, Agent, or Firm* — Trop, Pruner & Hu, P.C.

(57) ABSTRACT

In one embodiment, the present invention includes apparatus that is formed on a single semiconductor die having one or more cores, a memory controller, and a hub coupled to the memory controller. The hub includes multiple fabrics each to communicate with a peripheral controller via a target interface and a master interface according to a first protocol, and where the fabrics are serially coupled via a first plurality of target interfaces in an upstream direction and a second plurality of target interfaces in a downstream direction. Other embodiments are described and claimed.

19 Claims, 9 Drawing Sheets

(56) References Cited

U.S. PATENT DOCUMENTS

| | | |
|---|---|---|
| 7,421,543 B2 | 9/2008 | Suzuki |
| 7,457,905 B2 | 11/2008 | Gehman |
| 7,506,089 B2 | 3/2009 | Cho et al. |
| 7,573,295 B1 | 8/2009 | Stadler |
| 7,673,087 B1 | 3/2010 | Ansari et al. |
| 7,685,346 B2 | 3/2010 | Teh |
| 7,723,902 B2 | 5/2010 | Mandhani et al. |
| 7,734,856 B2 | 6/2010 | Reinig |
| 7,783,819 B2 | 8/2010 | Mandhani |
| 7,793,345 B2 | 9/2010 | Weber et al. |
| 7,809,024 B2 | 10/2010 | Rijpkema et al. |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,069,286 B1 | 11/2011 | Orthner et al. |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2003/0227926 A1 | 12/2003 | Ramamurthy et al. |
| 2004/0177176 A1 | 9/2004 | Li et al. |
| 2004/0218600 A1 | 11/2004 | Alasti et al. |
| 2005/0010687 A1 | 1/2005 | Dai |
| 2005/0120323 A1 | 6/2005 | Goodnow et al. |
| 2005/0137966 A1 | 6/2005 | Munguia et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1 | 5/2006 | Lee et al. |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2005/0177664 A1 | 9/2008 | Clark et al. |
| 2008/0235415 A1 | 9/2008 | Clark et al. |
| 2008/0288689 A1 | 11/2008 | Hoang |
| 2008/0310458 A1 | 12/2008 | Rijpkema |
| 2009/0006165 A1 | 1/2009 | Teh et al. |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296624 A1 | 12/2009 | Ryu et al. |
| 2009/0296740 A1 | 12/2009 | Wagh et al. |
| 2009/0300245 A1* | 12/2009 | Shoemaker et al. .......... 710/105 |
| 2010/0199010 A1 | 8/2010 | Goren et al. |
| 2010/0220703 A1 | 9/2010 | Farrugia et al. |
| 2010/0235675 A1 | 9/2010 | Subramanian et al. |
| 2010/0262855 A1 | 10/2010 | Buch et al. |
| 2010/0278195 A1 | 11/2010 | Wagh |
| 2010/0293304 A1 | 11/2010 | Alexandron et al. |
| 2010/0312942 A1 | 12/2010 | Blinick et al. |
| 2011/0032947 A1 | 2/2011 | Brueggen |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2011/0238728 A1 | 9/2011 | Nagarajrao et al. |
| 2012/0051297 A1 | 3/2012 | Lee et al. |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0303842 A1 | 11/2012 | Cardinell et al. |
| 2012/0303899 A1 | 11/2012 | Ash et al. |
| 2012/0311213 A1 | 12/2012 | Bender et al. |
| 2013/0054845 A1 | 2/2013 | Nimmala et al. |
| 2013/0089095 A1 | 4/2013 | Chen et al. |

FOREIGN PATENT DOCUMENTS

| | | |
|---|---|---|
| KR | 10-2005-0082834 | 8/2005 |
| TW | 201003410 A1 | 1/2010 |
| WO | 2005071553 | 8/2005 |

OTHER PUBLICATIONS

U.S. Appl. No. 13/248,232, filed Sep. 29, 2011, entitled, "Common Idle State, Active State and Credit Management for an Interface", by Sridhar Lakshmanamurthy, et al. (2392).

U.S. Appl. No. 13/248,243, filed Sep. 29, 2011, entitled, "Aggregating Completion Messages in a Sideband Interface", by Sridhar Lakshmanamurthy, et al. (2394).

U.S. Appl. No. 13/248,252, filed Sep. 29, 2011, entitled, "Providing Error Handling Support to Legacy Devices", by Sridhar Lakshmanamurthy, et al. (2395).

U.S. Appl. No. 13/248,263, filed Sep. 29, 2011, entitled, "Providing Multiple Decode Options for a System-On-Chip (SoC)", by Sridhar Lakshmanamurthy, et al. (2396).

U.S. Appl. No. 13/248,270, filed Sep. 29, 2011, entitled, "Supporting Multiple Channels of a Single Interface", by Sridhar Lakshmanamurthy, et al. (2397).

U.S. Appl. No. 13/248,276, filed Sep. 27, 2011, entitled, "Issuing Requests to a Fabric", by Sridhar Lakshmanamurthy, et al. (2398).

U.S. Appl. No. 13/306,244, filed Nov. 29, 2011, entitled, "Providing a Sideband Message Interface for System on a Chip (SoC)", by Robert P. Adler, et al. (2572).

U.S. Appl. No. 13/222,354, filed Aug. 31, 2011, entitled, "Providing Adaptive Bandwidth Allocation for a Fixed Priority Arbiter", by Kie Woon Lim, et al. (2400).

International Searching Authority, "Notification of Transmittal of the International Search Report and the Written Opinion of the International Searching Authority," mailed Jan. 2, 2013, in International application No. PCT/US/2012/050992.

U.S. Patent and Trademark Office, Office Action mailed Jun. 7, 2013 with Reply filed Sep. 3, 2013, in U.S. Appl. No. 13/248,232.

U.S. Patent and Trademark Office, Office Action mailed Jun. 20, 2013 with Reply filed Sep. 18, 2013, in U.S. Appl. No. 13/248,243.

U.S. Patent and Trademark Office, Office Action mailed Apr. 23, 2013 with Reply filed Jul. 22, 2013, in U.S. Appl. No. 13/248,263.

U.S. Patent and Trademark Office, Office Action mailed Jun. 14, 2013 with Reply filed Sep. 9, 2013, in U.S. Appl. No. 13/248,270.

U.S. Patent and Trademark Office, Office Action mailed Jun. 20, 2013 with Reply filed Sep. 17, 2013, in U.S. Appl. No. 13/248,276. .

U.S. Patent and Trademark Office, Office Action mailed Sep. 18, 2013, in U.S. Appl. No. 13/248,252.

Intel Corporation, "An Introduction to the Intel QuickPath Interconnect," Jan. 2009, pp. 1-22.

Sousek, et al., "PCI Express Core Integration with the OCP Bus," CAST, Inc. 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

Taiwan Patent Office, Office Action mailed Apr. 30, 2014 in Taiwan Application No. 101130840.

U.S. Patent and Trademark Office, Office Action mailed Dec. 3, 2013, with Reply filed Feb. 26, 2014, in U.S. Appl. No. 13/248,234.

U.S. Patent and Trademark Office, Final Office Action mailed Jun. 13, 2014, with Reply to Final filed Aug. 7, 2014 in U.S. Appl. No. 13/248,234.

U.S. Patent and Trademark Office, Final Office Action mailed Apr. 8, 2014, with Reply filed Jun. 6, 2014, in U.S. Appl. No. 13/248,252.

U.S. Patent and Trademark Office, Office Action mailed Mar. 31, 2014, with Reply filed Jun. 26, 2014, in U.S. Appl. No. 13/222,354.

U.S. Patent and Trademark Office, Final Office Action mailed Jul. 7, 2014, with Reply filed Aug. 22, 2014 in U.S. Appl. No. 13/222,354.

(56) References Cited

OTHER PUBLICATIONS

U.S. Patent and Trademark Office, Office Action mailed Oct. 23, 2013, with Reply filed Jan. 22, 2014, in U.S. Appl. No. 13/306,244.

U.S. Patent and Trademark Office, Final Office Action mailed Apr. 30, 2014, with PreAppeal Request and Notice of Appeal filed Jul. 23, 2014 in U.S. Appl. No. 13/306,244.

PCI-SIG, "PCI Local Bus Specification, Revision 3.0," Feb. 3, 2004, 3 pages.

U.S. Appl. No. 14/326,654, filed Jul. 9, 2014, entitled "Common Idle State, Active State and Credit Management for an Interface", by Sridhar Lakshmanamurthy, et al.

U.S. Appl. No. 14/209,207, filed Mar. 13, 2014, entitled "Aggregating Completion Messages in a Sideband Interface", by Sridhar Lakshmanamurthy, et al.

U.S. Appl. No. 14/209,184, filed Mar. 13, 2014, entitled "Providing Multiple Decode Options for a System-On-Chip (SoC) Fabric", by Sridhar Lakshmanamurthy, et al.

U.S. Appl. No. 14/209,146, filed Mar. 13, 2014, entitled "Supporting Multiple Channels of a Single Interface", by Sridhar Lakshmanamurthy, et al.

U.S. Appl. No. 14/295,810, filed Jun. 4, 2014, entitled "Issuing Requests to a Fabric", by Sridhar Lakshmanamurthy, et al.

U.S. Patent and Trademark Office, Office Action mailed Jul. 22, 2014, in U.S. Appl. No. 14/295,810.

\* cited by examiner

INTEGRATING INTELLECTUAL PROPERTY (IP) BLOCKS INTO A PROCESSOR

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. And it is difficult to design any SoC that accommodates general-purpose processor cores along with such IP blocks, due to the customized nature of both processor design and IP block design.

DETAILED DESCRIPTION

In various embodiments, different components such as direct media interface (DMI)/PCIe™ controllers, display engine, manageability engine, memory arbiter, cores, power control unit and other such components can be integrated using an on-die protocol. More specifically, these components, all implemented on a single semiconductor die, can be coupled via one or more hierarchies of a fabric that provides for high bandwidth primary communication and low bandwidth sideband communication. A hub implemented via multiple fabric interfaces can provide a basic platform to enable more IP integration into processors and SoCs.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor that includes various homogeneous and/or heterogeneous processing agents, and additional components such as networking components, e.g., routers, controllers, bridge devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within an SoC or other chip. Such IP blocks can be of varying types, including general-purpose processors such as in-order or out-of-order cores, fixed function units, graphics processors, controllers, among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
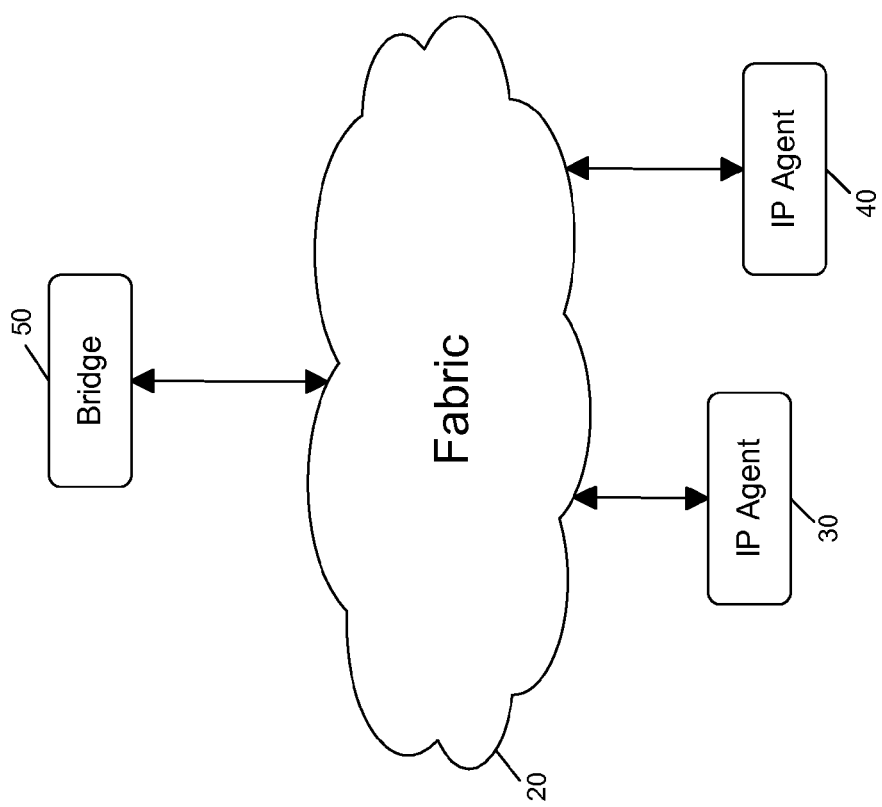
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or other semiconductor device and includes a fabric 20 that acts as an interconnect between various components. In the implementation shown, these components include IP agents 30 and 40, which can be independent IP blocks to provide various functionality such as compute capabilities, graphics capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability or design for test (DFx) interface. According to the IOSF specification, an agent may support any combination of these interfaces. Specifically, an agent can support 0-N primary interfaces, 0-N sideband message interfaces, and an optional DFx interface. However, according to the specification, an agent must support at least one of these 3 interfaces.

Figure 2:
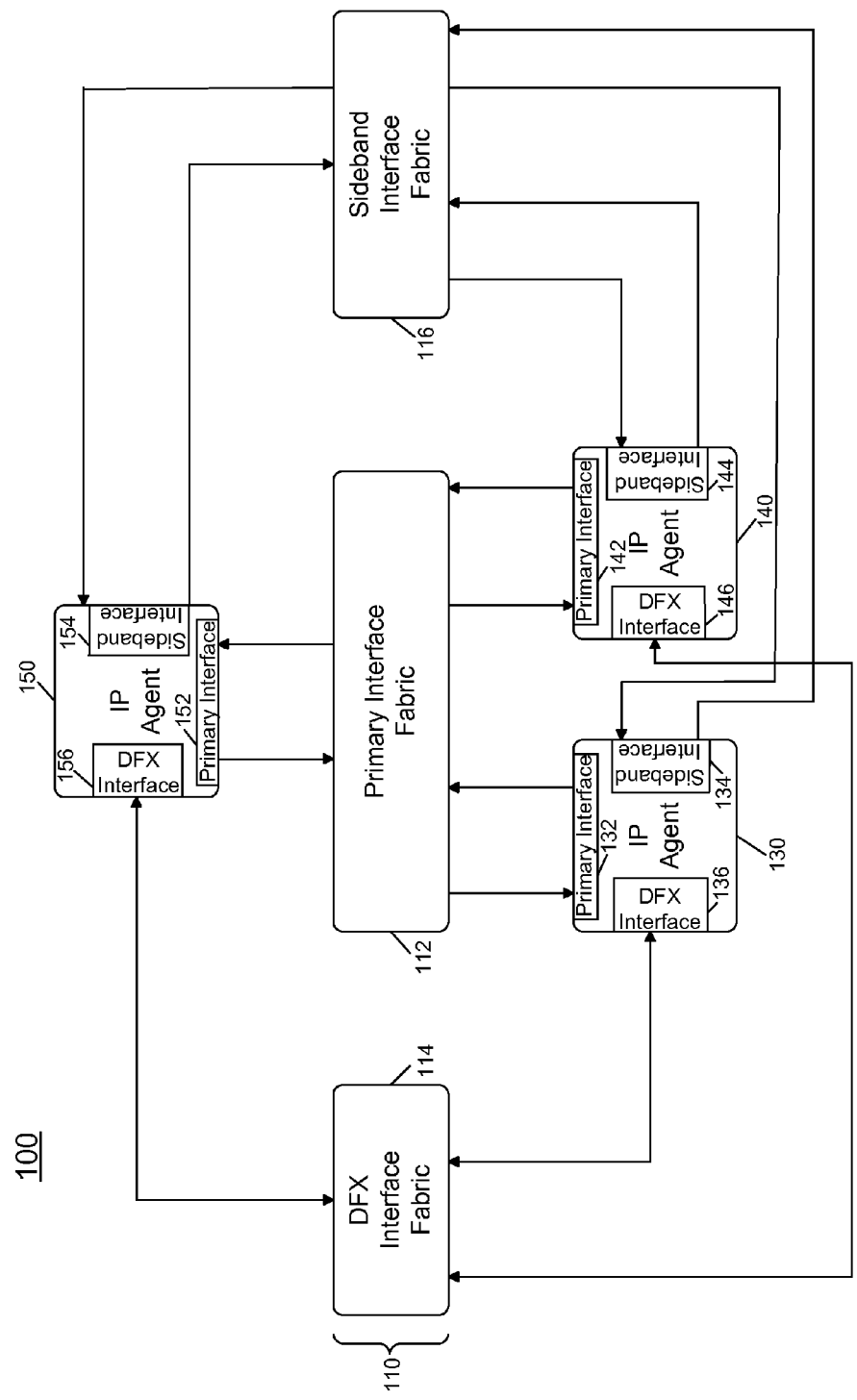
FIG. 2 is a block diagram of further details of an interconnect architecture in accordance with an embodiment of the present invention.

Fabric 20 may be a hardware element that moves data between different agents. Note that the topology of fabric 20 can be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, a fabric 110 includes various interfaces, including a primary interface 112, a DFx interface 114, and a sideband interface 116. Primary interface 112 can be used for in-band communication, e.g., between a host processor such as a central processing unit (CPU) or other processor and an agent. Primary interface 112 may further enable communication of peer transactions between agents and supported fabrics. All transaction types including memory, input output (10), configuration, and in-band messaging can be delivered via primary interface 112. Thus the primary interface may act as a high performance interface for data transferred between peers and/or communications with upstream components.

In various implementations, primary interface 112 implements a split transaction protocol to achieve maximum concurrency. That is, this protocol provides for a request phase, a grant phase, and a command and data phase. Primary interface 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface 112 supports the concept of distinct channels to provide a mechanism for independent data flows throughout the system. As will be described further, primary interface 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface 112 may support PCI ordering rules and enumeration.

In turn, sideband interface 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, configuration shadowing, test modes and so forth, a sideband interface 116 according to the IOSF specification standardizes all out-of-band communication, promoting modularity and reducing validation requirements for IP reuse across different designs. In general, sideband interface 116 may be used to communicate low performance information, rather than for primary data transfers, which typically may be communicated via primary interface 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
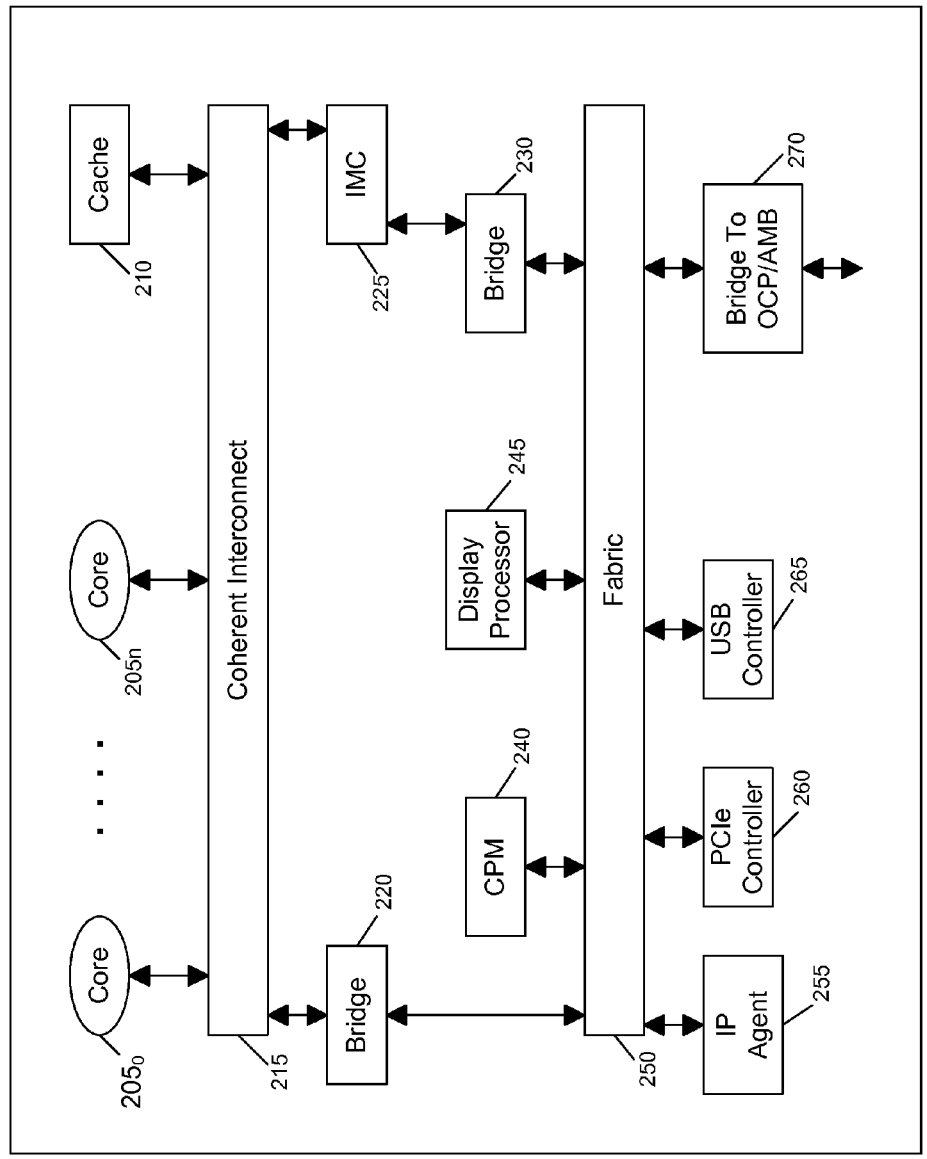
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
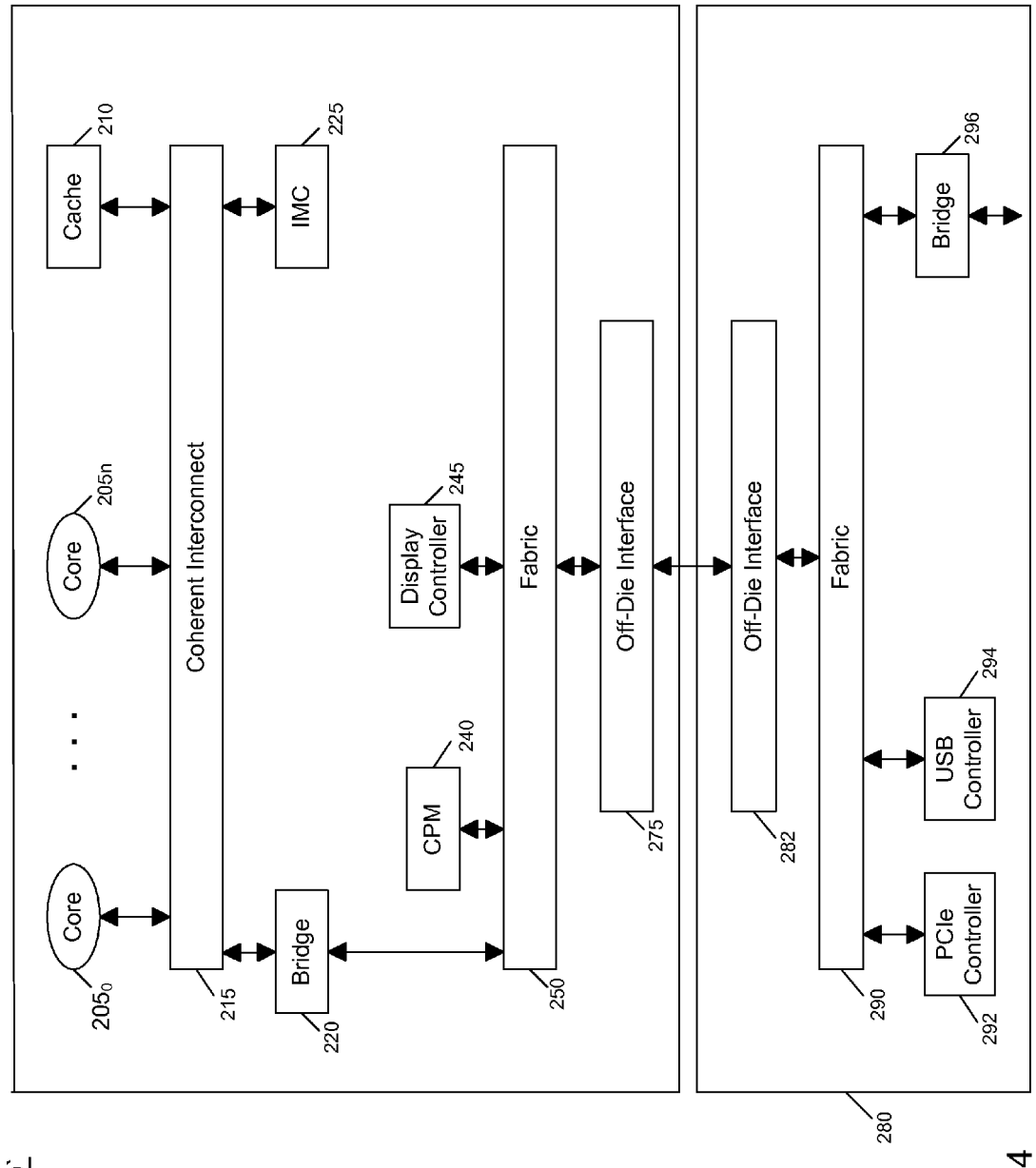
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
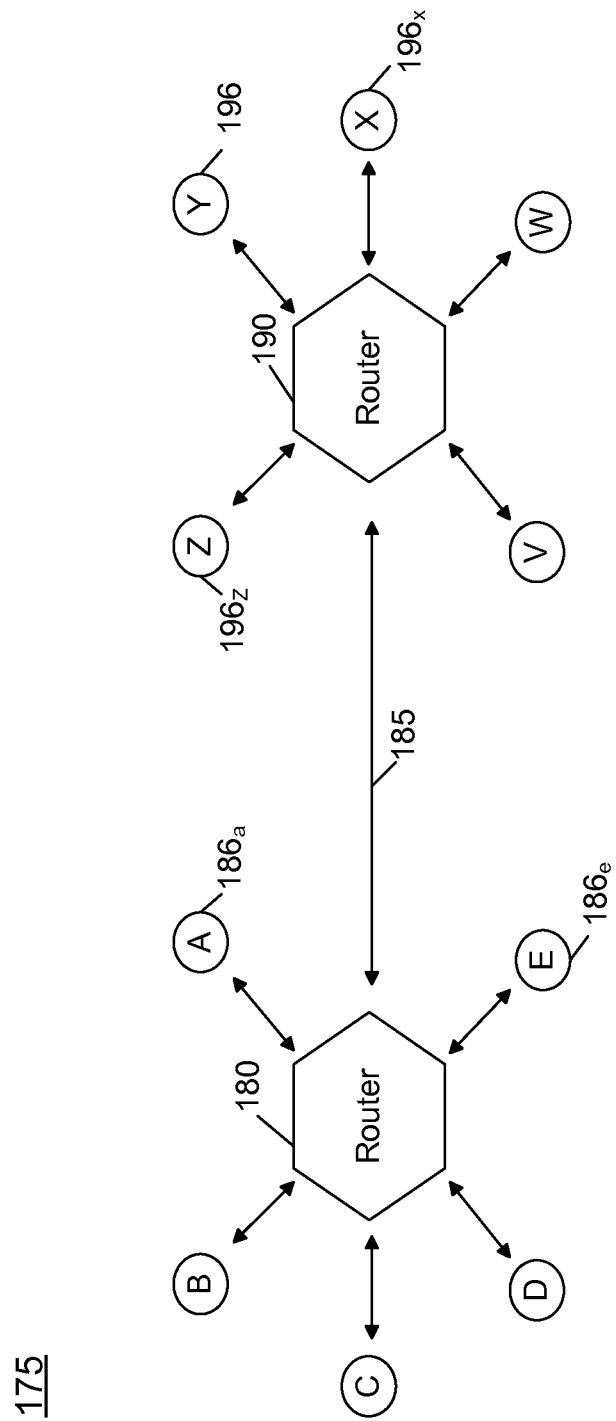
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

Figure 6:
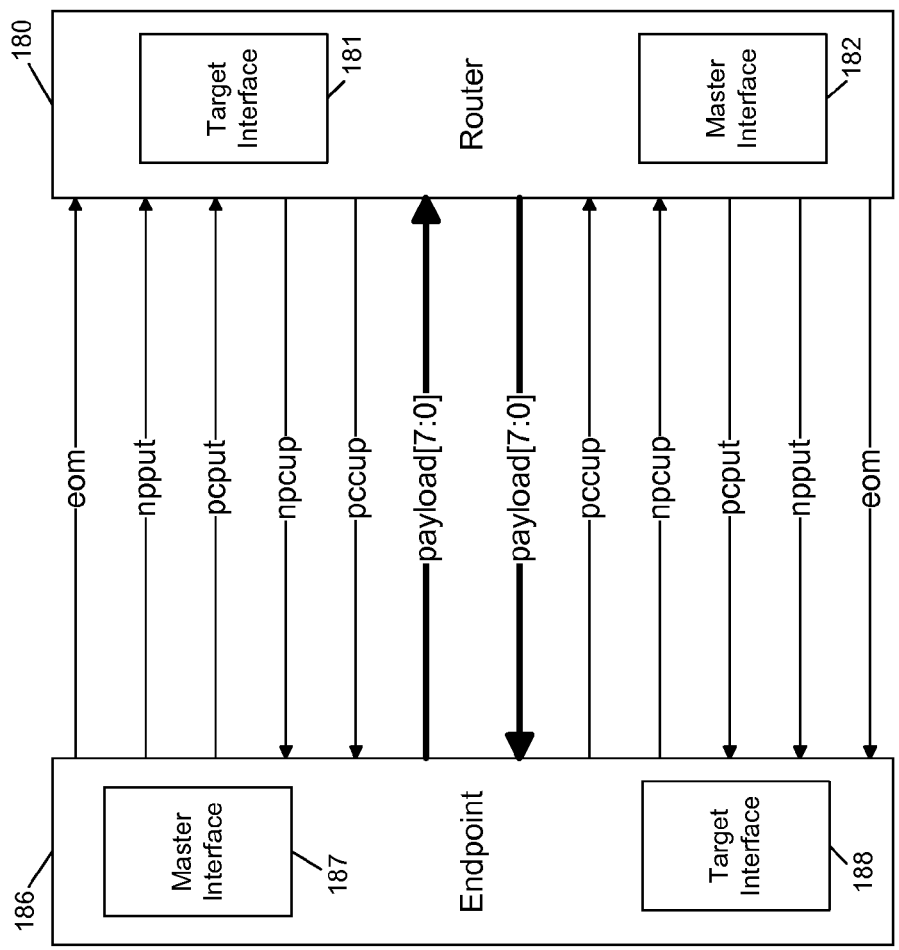
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

Figure 7:
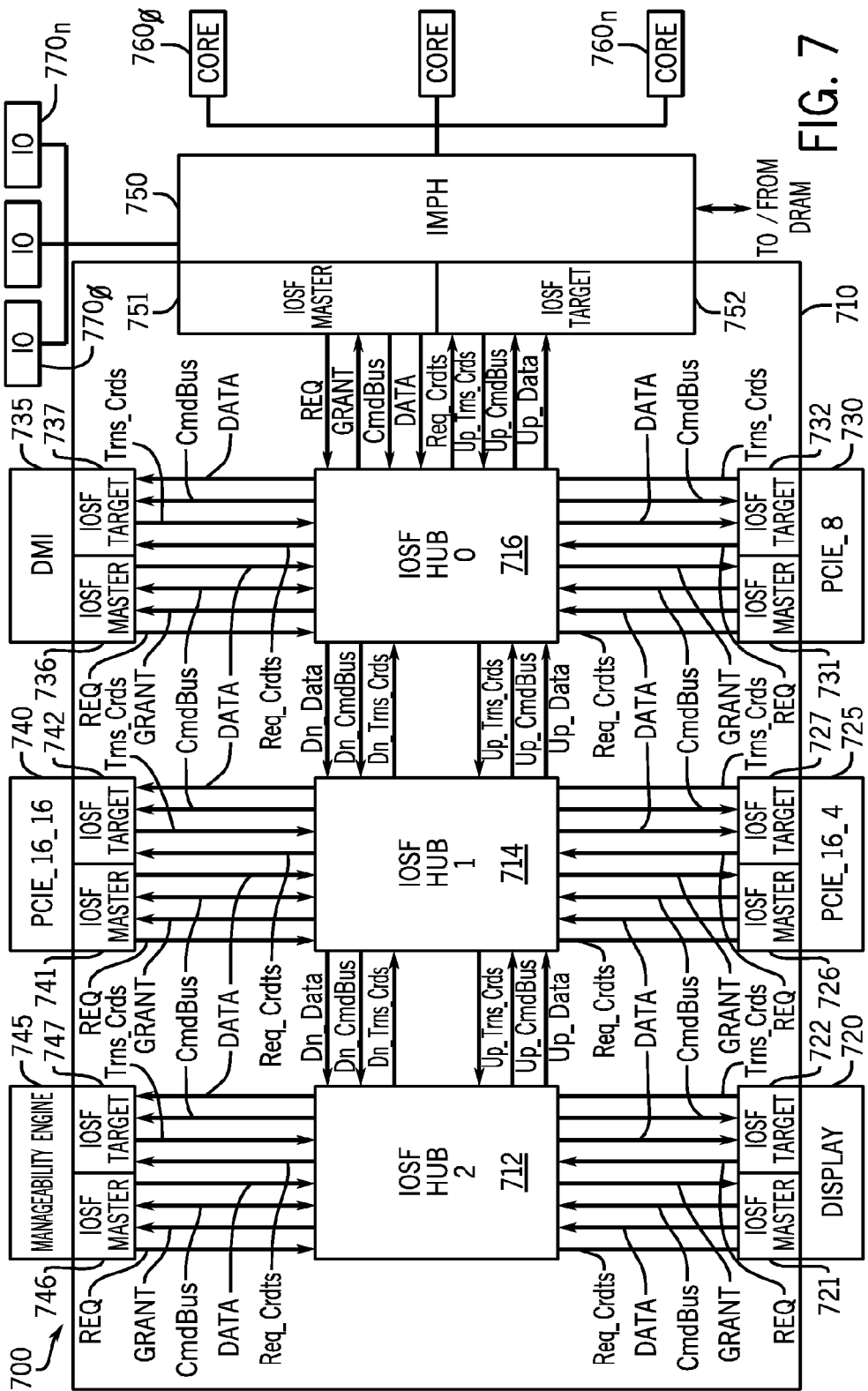
FIG. 7 is a block diagram of interconnection of a primary channel fabric in accordance with an embodiment of the present invention.

Referring now to FIG. 7, shown is a block diagram of interconnection of a primary channel fabric in accordance with an embodiment of the present invention. As shown in FIG. 7, system 700 may be a SoC that includes different IP agents, along with a plurality of cores, e.g., of a many-core processor, which can include both in-order and out-of-order cores. In addition, on-chip chipset components can be provided to thus interface the SoC with on-chip agents, in addition to off-chip memory and/or other components. As seen in the embodiment of FIG. 7, system 700 includes a hub 710 that can be implemented using individual fabrics in accordance with the IOSF specification. As seen, these fabrics may be serially connected to one another and furthermore each may be coupled to one or more different IP agents. Specifically in an upstream direction, a first fabric 712 may interface with a display controller 720 via a master interface 721 and a target interface 722 of the display controller. As in the above discussion of a primary channel according to the IOSF specification, these master and target interfaces may communicate with corresponding target and master interfaces, respectively of fabric 712. Accordingly, in a fabric-to-agent direction, data and command information can be directed to the IP agent, and corresponding transaction credits can be communicated back to the fabric. And, in the agent-to-fabric direction, data, command and request information may be communicated, with corresponding grant and request credit information communicated back to the agent. As further seen, fabric 712 may also communicate with a manageability engine 745 via a master interface 746 and a target interface 747 of the manageability engine.

Note that the communications between the fabrics themselves, namely fabric 712, an intermediate fabric 714, and an upstream fabric 716 may be generally via a target interface only. That is, in various embodiments there are no request and grant communications or credit initialization process. Instead, the fabrics communicate with each other via a target interface protocol, which thus is a more basic protocol than a master-target interface according to the IOSF specification. Thus in an upstream direction upstream commands and data are communicated, with corresponding upstream transaction credits being sent back to the originating fabric as space becomes available in the corresponding buffer in the target fabric, and in a downstream direction data and command information are communicated downstream with corresponding downstream transaction credits communicated back to the initiator. Note that these credits can be fixed for a given implementation such that no credit initialization protocol is performed, as is done on the master-target interfaces according to the IOSF specification.

As with fabric 712, fabric 714 may also communicate with multiple IP agents. Specifically, fabric 714 is coupled to multiple PCIe™ controllers, namely a PCIe™ controller 725 (e.g., a PCIe™×16 controller) via corresponding master and target interfaces 726 and 727 and a PCIe™ controller 740 (e.g., a PCIe™×4 controller) via corresponding master and target interfaces 741 and 742. In turn, fabric 716 also communicates with multiple IP agents, namely a PCIe™ controller 730 (e.g., a PCIe™×8 controller) via corresponding master and target interfaces 731 and 732 and a DMI 735 via corresponding master and target interfaces 736 and 737 which in turn can communicate with other components such as a peripheral controller hub (PCH), not shown for ease of illustration in the embodiment of FIG. 7.

To provide communications upstream to an IMPH 750, upstream fabric 716 may include master and target interfaces to communicate with corresponding master interface 751 and target interface 752 of IMPH 750. As seen, IMPH 750 may be coupled via a memory interconnect to memory, e.g., off-chip dynamic random access memory (DRAM). Although the scope of the present invention is not limited in this regard, furthermore, IMPH 750 may also communicate with a plurality of cores $760_0$-$760_n$, which can be homogeneous or heterogeneous cores, and IO agents $770_0$-$770_n$. Although shown with this particular implementation in the embodiment of FIG. 7, understand the scope of the present invention is not limited in this regard.

Figure 8:
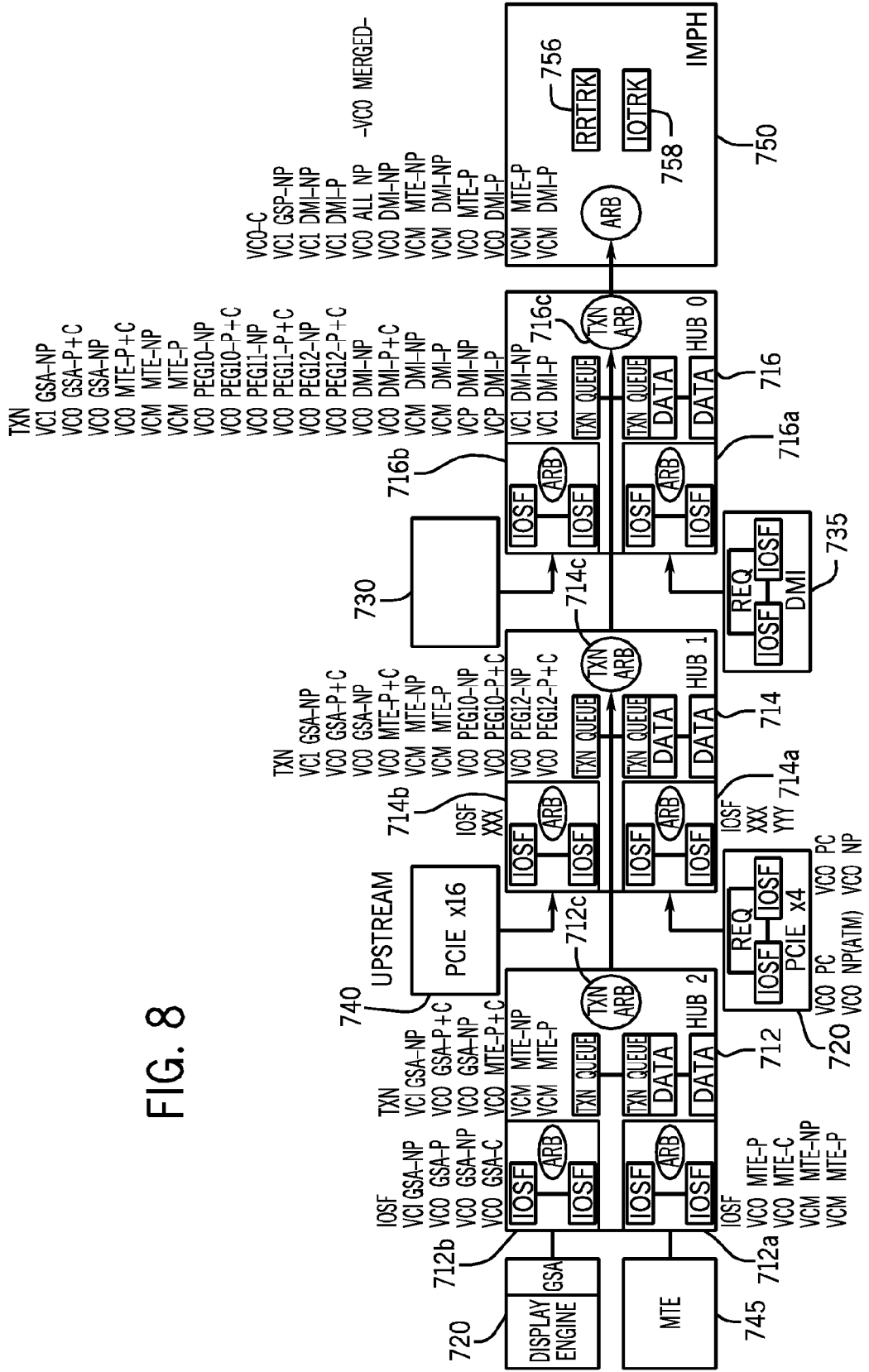
FIG. 8 are further details of a primary channel hub in accordance with an embodiment of the present invention.

Referring now to FIG. 8, shown are further details of a primary channel hub in accordance with an embodiment of the present invention. Specifically, FIG. 8 shows upstream channels for the fabrics and agents. As seen generally, each fabric includes a corresponding set of IOSF queues to provide for upstream communication of transactions incoming from the agents. In turn, these queues, which may be controlled by a corresponding arbiter, may be coupled to internal transaction and data queues which in turn may be controlled in the upstream direction by a transaction arbiter that operates according to a credit-based flow control to thus provide transactions in the upstream direction. Note that differing numbers of channels may be present in the different agents and can in turn map to a smaller number of channels as transactions are communicated upstream through upstream hub 716 and to IMPH 750.

As specifically seen in FIG. 8, incoming transactions from manageability engine 745 and display engine 720 may be received by corresponding target interfaces 712a and 712b of fabric 712. These target interfaces may be in accordance with the IOSF specification, and accordingly may include multiple queues and a corresponding arbiter. In turn, when selected for transmission via the corresponding arbiter, they are provided to corresponding transaction and data queues of a fabric-to-fabric interface 712c which further includes a transaction arbiter to thus forward transactions along to a corresponding fabric-to-fabric interface 714c of fabric 714. In turn, this interface may couple to a corresponding fabric-to-fabric interface 716c of hub 716.

As further seen with regard to fabric 714, incoming transactions from PCIe™ controllers 720 and 740 may be coupled through corresponding target interfaces 714a and 714b according to the IOSF specification. Similarly, incoming transactions from DMI 735 and PCIe™ controller 730 may be coupled to corresponding target interfaces 716a and 716b of fabric 716 according to the IOSF specification. Thus as seen, at each fabric, additional virtual channels are represented, reflecting the virtual channels from the most downstream-connected fabric on upward, such that upstream fabric 716 includes the largest number of incoming virtual channels, which it allocates onto a fewer number of virtual channels, including a single VC0 channel. Although in the embodiment shown in FIG. 8, only VC0 channel is merged, understand the scope of the present invention is not limited in this regard, and in other embodiments, additional virtual channels can be merged together. Still further, instead of merging together all VC0 channels, in other embodiments a different or multiple virtual channels can be merged together. As further seen in FIG. 8, IMPH 750 includes a read return tracker 756 and an IO tracker 758. Although shown with these particular channels and mappings in the embodiment of FIG. 8, understand the scope of the present invention is not limited in this regard.

Thus in the embodiment of FIG. 8, for ease of timing convergence, all agent originated requests flow from the agent toward upstream fabric 716 and in turn towards IMPH 750, and all IMPH originated requests flow downstream to an agent. The IOSF interface is between each fabric and agent. Since the fabrics are implemented as an IOSF-based fabric, the fabric-to-fabric interfaces use a simple credit-based flow control protocol.

Each fabric supports an arbitration of all the incoming channels and request types in both upstream and downstream directions. In the embodiment shown in FIG. 8, manageability engine 745, display controller 720 and PCIe™ controller 740 each support two channels. PCIe™ controllers 720 and 740 each support 1 channel and DMI 735 supports four channels. This results in an accumulation of a large number of channels at fabric 716, where the arbitrator in the upstream direction thus receives 12 channels, each supporting 3 request types, in one embodiment. To simplify arbitration here, all the VC0 channels of all IP agents can be collapsed into a single VC0. This eliminates a large number of channels to be supported between the upstream fabric and the IMPH. In one embodiment, the following simplified channel ID encodings in Table 1 can be used to establish mappings of virtual channel traffic to channel identifiers.

TABLE 1

HUB-to-IMPH (Upstream)

| Channel | Source | CHID[2] | CHID[1] | CHID[0] |
|---|---|---|---|---|
| VC0 | All | 0 | 0 | 0 |
| VCp | DMI | 0 | 0 | 1 |
| VCm | PMT | 0 | 1 | 0 |
| VCm | DMI | 0 | 1 | 1 |
| VC1 | DMI | 1 | 0 | 0 |
| VC1 | DE | 1 | 0 | 1 |
| Reserved | | 1 | 1 | 0 |
| Reserved | | 1 | 1 | 1 |

IMPH-to-HUB (Downstream)

| Target | Channel | CHID[3] | CHID[2] | CHID[1] | CHID[0] |
|---|---|---|---|---|---|
| DMI | VC0 | | | | |
| DMI | VC1 | 0 | 0 | 0 | 0 |
| DMI | VCp | 1 | 0 | 0 | 1 |
| DMI | VCm | 0 | 1 | 1 | 0 |
| PEG12(×4) | VC0 | 1 | 0 | 0 | 0 |
| PEG11(×8) | VC0 | 0 | 0 | 1 | 1 |
| PEG10(×16) | VC0 | 0 | 0 | 1 | 0 |
| DE | VC0 | 0 | 0 | 0 | 1 |
| DE | VC1 | 0 | 1 | 0 | 1 |
| PMT | VC0 | 1 | 0 | 1 | 0 |
| PMT | VCm | 0 | 1 | 0 | 0 |
| Reserved | | 0 | 1 | 1 | 1 |
| Reserved | | 1 | 0 | 1 | 1 |
| Reserved | | 1 | 1 | 0 | 0 |
| Reserved | | 1 | 1 | 0 | 1 |
| Reserved | | 1 | 1 | 1 | 0 |
| Reserved | | 1 | 1 | 1 | 1 |

IP-to-HUB (Upstream)

| Source | Channel | CHID[1] | CHID[0] |
|---|---|---|---|
| DMI | VC0 | 0 | 0 |
| DMI | VC1 | 0 | 1 |
| DMI | VCp | 1 | 0 |
| DMI | VCm | 1 | 1 |
| PEG16_4a | VC0 | | 0 |
| PEG16_8 | VC0 | | 0 |
| PEG16_16 | VC0 | | 0 |
| PEG16_16 | VC1 | | 1 |
| DE | VC0 | | 0 |
| DE | VC1 | | 1 |
| PMT | VC0 | | 0 |
| PMT | VCm | | 1 |

HUB-to-IP (Downstream)

| Target | Channel | CHID[1] | CHID[0] |
|---|---|---|---|
| DMI | VC0 | 0 | 0 |
| DMI | VC1 | 0 | 1 |
| DMI | VCp | 1 | 0 |

TABLE 1-continued

| | | | |
|---|---|---|---|
| DMI | VCm | 1 | 1 |
| PEG16_4a | VC0 | | 0 |
| PEG16_8 | VC0 | | 0 |
| PEG16_16 | VC0 | | 0 |
| PEG16_16 | VC1 | | 1 |
| DE | VC0 | | 0 |
| DE | VC1 | | 1 |
| PMT | VC0 | | 0 |
| PMT | VCm | | 1 |

Since a collapsed VC is coupled between fabric 716 and IMPH 750 for all agents' VC0 channels, fabric 716 may be configured to send source information to the IMPH so that completions can come back downstream with appropriate destination identifiers. The following Table 2 describes the source identifiers used for that purpose.

TABLE 2

| HUB-to-IMPH (Upstream) | | | |
|---|---|---|---|
| | Src_id[2:0] | | |
| Source | [2] | [1] | [0] |
| PEG10 | 0 | 0 | 1 |
| PEG11 | 0 | 1 | 0 |
| PEG12 | 0 | 1 | 1 |
| PMT | 1 | 0 | 0 |
| DMI | 0 | 0 | 0 |
| DMI-Private | 1 | 1 | 0 |
| DE | 1 | 0 | 1 |
| Reserved | 1 | 1 | 1 |

Data bus widths for various agents coupled to the fabric can be different. For example, in one embodiment, the display engine and IMPH can support different data bus widths for master and target interfaces (e.g., 16 bytes in the upstream direction and 32 bytes in the downstream direction). In this way, hardware design can be optimized for given bandwidth requirements.

The fabric and the IP agents may support differing flow control request and transaction credits to optimize the hardware design (and thus can include differing numbers of corresponding request and transaction queues). For the agents and fabric interfaces where high bandwidth is to be implemented, a larger number of credits (and corresponding queues) can be supported to ensure that command and data buses can send back-to-back requests without any bubbles in the pipelines. For channels where bandwidth is not as important, a smaller number of credits, e.g., minimum credits (e.g., 1 credit) are supported. And with the given transaction and request credits for traffic connected to and from various IP agents seeking to access memory, a primary fabric can support variable peak bandwidths.

In various embodiments a sideband network may include a plurality of endpoints connected through a topology including routers, frequency converters and width converters that enables communication to occur between various IP agents including cores and system agent circuitry (e.g., a so-called uncore) running at various frequencies. This sideband network may be used for purposes such as control register accesses, DFT accesses, power management flows, etc.

While all the router-to-agent links may include IOSF based flow control, the links between any two routers can instead implement a basic credit based flow control, namely fixed credits that are implemented by hard encoding, avoiding the need for a credit initialization process.

To simplify network design, frequency conversion and width conversion may occur only between two routers. In one embodiment the sideband network may run through 4 different frequency domains and supports communications having flit widths of 8 bit and 16 bits.

To realize integration of various components such as different IP agents, interface logic to interface with a fabric can be provided for each agent, as described above. In addition, a hub logic that can be formed of multiple fabric instantiations may include a simplified credit-based mechanism between the fabric instantiations. In addition, multiple virtual channels (VC's) may be collapsed into a single VC for area reduction. To this end, certain packets may be modified to allow later redistribution into multiple VC's. Also, a semi-centralized frequency/width conversion may occur between frequency domains on a sideband channel scheme. Credit allocation and pipeline design can provide full bandwidth for bandwidth sensitive areas.

In one embodiment, an IOSF implementation of a SoC may include a primary channel fabric that supports a bandwidth of up to 12.8 gigabits per second (GBs) between multiple PCIe™ controllers (e.g., ×16, ×8, ×4), DMI controller (×4), display engine, manageability engine, and an integrated memory and peripheral hub (IMPH), which provides arbitration for memory accesses and an interface to input/output devices and one or more cores. The SoC may further include a sideband network having a large number of end points connected through a topology containing routers, frequency converters, and at least one width converter that enables the communication to occur between various units across system agent logic and multiple cores running at various frequencies.

A primary channel fabric may be used to support a high bandwidth, high frequency design. In one such embodiment, a cascaded structure having a plurality of fabrics may form a hub, which in one embodiment may operate at a 800 megahertz (MHz) frequency. Each hub, corresponding to a fabric, supports a primary interface to one or more IP agents, to enable requests to flow downstream towards an agent.

Figure 9:
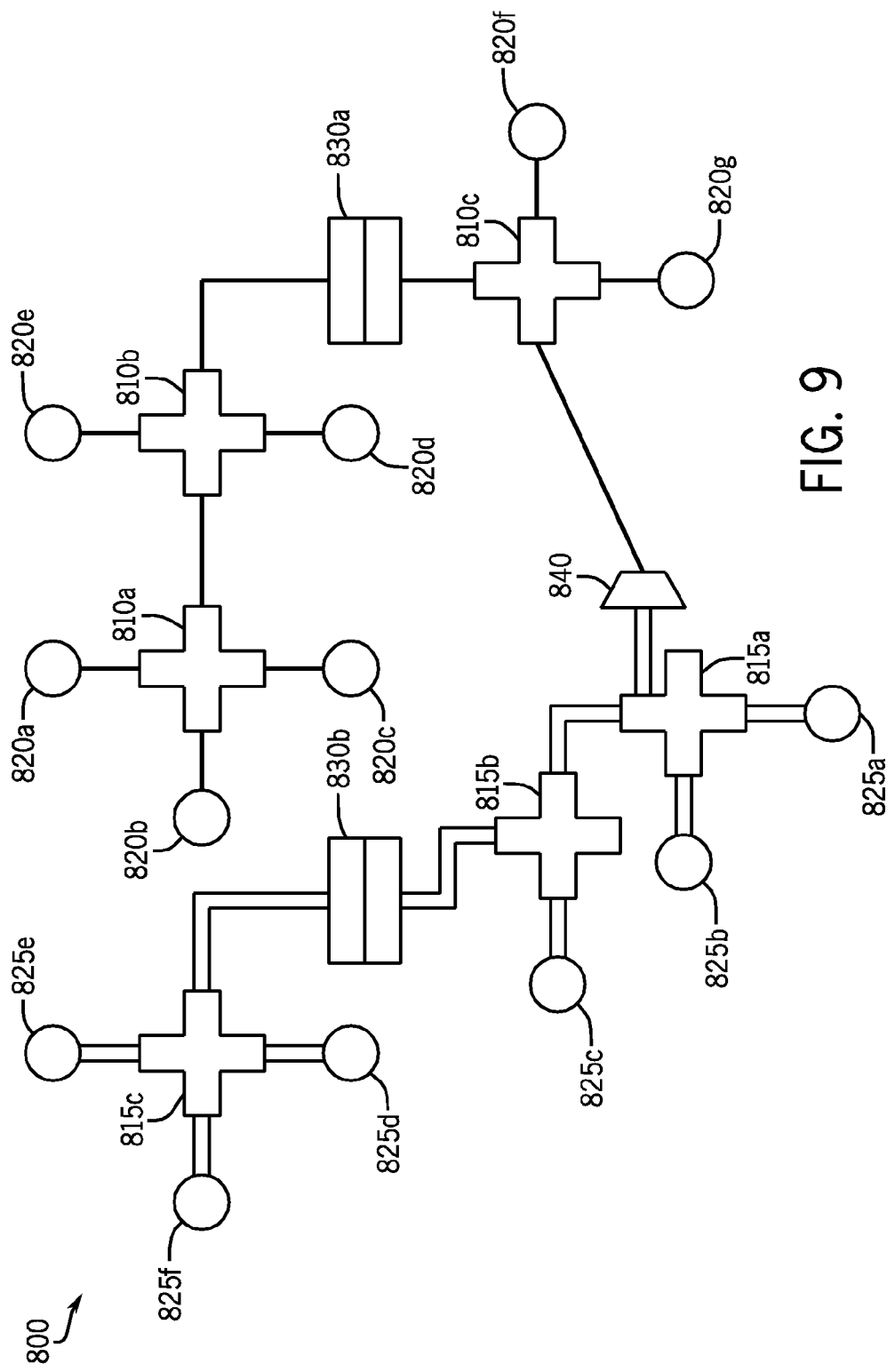
FIG. 9 is a block diagram of a sideband architecture in accordance with an embodiment of the present invention.

Referring now to FIG. 9, shown is a block diagram of a sideband architecture in accordance with an embodiment of the present invention. As shown in FIG. 9, sideband system 800 shown may be just a portion of a sideband system of a SoC. That is, in some implementations many more components may be present in a sideband system.

Generally, shown in FIG. 9 are a plurality of routers 810a-810c and 815a-815c. Each of these routers may in turn couple with one or more endpoints as well as at least one other router. As seen, endpoints 820a-820g may be coupled to selected ones of routers 810. In various embodiments, the endpoints may correspond to components or portions of components of the SoC. For example, in various implementations each endpoint may correspond to a fabric, IP agent, core, controller or other component or portion thereof. In the embodiment of FIG. 9, routers 810 and endpoints 820 may communicate at a given bit width, e.g., an 8 bit bit width. As further seen, a frequency conversion may take place in a frequency converter 830a. Accordingly, this frequency domain change occurs between routers 810b and 810c such that endpoints coupled to router 810c communicate at a first frequency, and endpoints coupled to routers 810a and 810b communicate at a different frequency.

Still referring to FIG. 9, in addition to frequency conversions, bit width conversions also may take place. Specifically a bit width converter 840 may couple between router 810c and router 815a. In the embodiment shown in FIG. 9, routers 815a-815c may all operate at a common bit width, e.g., 16 bits. In turn, each router 815 may couple to one or more endpoints as well as at least one other router. In the embodiment shown in FIG. 9, endpoints 825a-825f may be present. As above, these endpoints may correspond to various components of the SoC. Note that an additional frequency converter 830b may couple between routers 815b and 815c to provide for a further frequency conversion. And it is further possible for a bit width conversion and a frequency conversion to both be implemented between two routers. Although shown with these limited routers, endpoints, frequency converters and bit width converters, understand the scope of the present invention is not limited in this regard and in actual SoC implementations many more routers, endpoints and converters may be present.

Thus embodiments may be used in a SoC including a plurality of cores to implement a communication protocol that integrates various components while maintaining high bandwidth requirements. And at the same time, power management solutions can be implemented to maintain idle power lower with the help of ISM handshakes that provide for a standard request/grant handshake instead of custom sideband wires to simplify reuse.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one core;
   a memory controller coupled to the at least one core; and
   a hub coupled to the memory controller, the hub including a plurality of fabrics each to communicate with at least one peripheral controller via a target interface and a master interface according to a first protocol, wherein the plurality of fabrics are directly serially coupled to at least one other of the plurality of fabrics via a first plurality of target interfaces in an upstream direction and a second plurality of target interfaces in a downstream direction, and a first one of the plurality of fabrics is coupled to a first peripheral controller via target interface having a first width and a master interface having a second width, the second width greater than the first width.

2. The apparatus of claim 1, wherein the at least one core, the memory controller and the hub are configured on a single semiconductor die.

3. The apparatus of claim 1, wherein the master interface of the first fabric and the target interface of the first peripheral controller include a plurality of virtual channels.

4. The apparatus of claim 1, wherein an upstream fabric of the plurality of fabrics coupled to the memory controller is to communicate traffic from a plurality of first virtual channels received from the other fabrics of the plurality of fabrics via a single virtual channel coupled to the memory controller.

5. The apparatus of claim 4, wherein the upstream fabric is to include a source identifier corresponding to a source agent with a transaction destined to the memory controller.

6. The apparatus of claim 5, wherein the upstream fabric is to receive a completion for the transaction from the memory controller with the source identifier and to route the completion to the source agent responsive to the source identifier.

7. The apparatus of claim 1, wherein the first fabric is to receive a message from the memory controller having a first bit width and to convert the message to a second bit width and to send the second bit width message to the first peripheral controller.

8. The apparatus of claim 1, wherein the first fabric includes a first master interface having different transaction queue sizes each having different credit sizes.

9. The apparatus of claim 1, further comprising a sideband channel including a first router and a second router, the first router coupled to a first plurality of endpoints and the second router coupled to a second plurality of endpoints, wherein a frequency conversion is to occur between the first router and the second router, the first router coupled to communicate with the first plurality of endpoints at a first frequency and the second router to communicate with the second plurality of endpoints at a second frequency.

10. The apparatus of claim 9, wherein the first router is to communicate with the first plurality of endpoints at a first width and the second router is to communicate with the second plurality of endpoints at a second width.

11. A system-on-chip (SoC) comprising:
    at least one core;
    an integrated peripheral and memory controller (IMPH) coupled to the at least one core;
    a hub coupled to the IMPH, the hub including a plurality of fabrics each to communicate with at least one peripheral controller via a primary channel system, each of the plurality of fabrics having a target interface and a master interface for the communication with the at least one peripheral controller; and
    a sideband channel system including a first router and a second router, the first router coupled to a first plurality of endpoints and the second router coupled to a second plurality of endpoints, wherein the endpoints include the at least one core, the IMPH, and the plurality of fabrics.

12. The SoC of claim 11, further comprising a width converter coupled between the first router and the second router, wherein the first router is to communicate with the first plurality of endpoints at a first width and the second router is to communicate with the second plurality of endpoints at a second width.

13. The SoC of claim 12, further comprising a frequency converter coupled between the first router and the second router, wherein the first router is to communicate with the first plurality of endpoints at a first frequency and the second router is to communicate with the second plurality of endpoints at a second frequency.

14. The SoC of claim 11, wherein the first router and the second router have a fixed number of credits for communication between the first and second routers.

15. The SoC of claim 14, wherein the first router has a configurable number of credits for communication with each of the first plurality of endpoints.

16. The SoC of claim 15, wherein the configurable number of credits is initialized at system reset according to an idle state machine.

17. An apparatus comprising:
    a sideband channel system including a first router and a second router coupled via a frequency converter, the first router coupled to a first plurality of endpoints and the second router coupled to a second plurality of endpoints, wherein the first plurality of endpoints are to operate at a first frequency and the second plurality of endpoints are to operate at a second frequency, the sideband channel system for communication of sideband information and separate from a primary channel system.

18. The apparatus of claim 17, further comprising the primary channel system to communicate between the first and second plurality of endpoints, wherein the first and second plurality of endpoints include at least one core, a memory controller, and a hub formed of a plurality of fabrics each to communicate with at least one peripheral controller via the primary channel system.

19. The apparatus of claim 17, wherein the apparatus comprises a system-on-chip (SoC) including the primary channel system and the sideband channel system.

* * * * *